United States Patent [19]

Michon

[11] 4,084,410
[45] Apr. 18, 1978

[54] FLEXIBLE COUPLING DEVICE

[75] Inventor: Pierre Michon, Chatillon-sous-Bagneux, France

[73] Assignee: Societe d'Etudes de Machines Thermiques, Saint Denis, France

[21] Appl. No.: 680,745

[22] Filed: Apr. 27, 1976

[51] Int. Cl.² ............................................. F16D 3/58
[52] U.S. Cl. ...................................... 64/12; 64/15 C
[58] Field of Search ............... 64/12, 19, 13, 14, 6, 64/27 R, 27 C

[56] References Cited

U.S. PATENT DOCUMENTS

| 732,079 | 6/1903 | Hunt | 64/12 |
|---|---|---|---|
| 1,234,213 | 7/1917 | Reno | 64/27 R |
| 1,815,639 | 7/1931 | Wilkin et al. | 64/12 |
| 2,858,682 | 11/1958 | Fawick | 64/27 R |
| 3,087,313 | 4/1963 | Kerley, Jr. | 64/12 |

Primary Examiner—Benjamin W. Wyche
Assistant Examiner—R. C. Turner
Attorney, Agent, or Firm—Philip Rodman

[57] ABSTRACT

Device for providing a flexible coupling between a driving member and a driven member, comprising a plate integral with the driving member, a plate integral with the driven member and a resilient assembly consisting of elements with wire loops arranged between said plates so as to become deformed under the action of a force or a torque so that the device will deform itself in parallel relation to the direction of a dimension or angularly without the other dimensions having been changed, the system assuming again its initial shape when the forces are no longer applied thereto.

14 Claims, 7 Drawing Figures

FLEXIBLE COUPLING DEVICE

The present invention relates to flexible or resilient coupling devices and like elastically deformable connecting means and to yielding guides.

In the present state of the art are available various coupling or connecting devices based generally upon the use of metal springs (such as plate springs, leaf-springs or blade-springs, helical or coil springs etc.) or of flexible elements made from various elastomers or plastics or synthetic materials.

The inconveniences of such devices are:

their lack of damping or shock-absorbing capability which gives rise to uncontrollable "dynamic" effects or surges or overstresses;

their want of being able to filter vibrations and noises, these devices exhibiting a high elasticity generally along one axis only and in such a case the other axes will transmit or convey vibrations and noises;

their lack of or defect in linearity of rigidity or stiffness or of phase-shift, in particular for the elastomers or plastics material giving moreover rise to difficulties in filtering vibrations and noises, difficulties in their use in feedback controlled, phase-locked, follow-up, keyed or like interlocked systems (instability, hunting).

Cable dampers or like wire-rope shock absorbers have already been used for providing couplings and have been made the subject matters of the French Pat. Nos. 1,275,754 and 1,380,185.

Such assemblies, however, using cable dampers or like wire-rope shock absorbers such as disclosed in the aforesaid patents exhibit several inconveniences which would restrict the applications thereof to a large extent.

According to the French Pat. Nos. 1,275,754 the use of an intermediate connecting part (121) between series of alternately back and forth extending flat cable runs arranged orthogonally two by two on the driving side as well as on the driven side is likely to provide vibrations modes that do not exist without any coupling. Moreover, applying a torsion or twist torque along the drive axis is compulsorily attended by the driving and driven parts being drawn near towards each other thereby generating an undesirable parasitic or spurious force likely to damage the driving and driven members.

According to the French Pat. No. 1,380,185 the inventor has partially obviated these defects but applying a torque to the drive shaft is then attended by a traction or tensile-compression force in the single cable (or series of sections or segments arranged end to end) used, arranged in polygonal relationship within a same plane extending at right angles to the driving and driven axes thereby resulting in:

a bad filtration of the vibrations as stated by the inventor himself;

a non-linearity of stiffness or rigidity of the device which would restrict its use to quite small angular displacements, deflections or ranges of movement. As a matter of fact the wire-rope or cable starts at first to work in bending relationship and then in pulling or tractive relationship thereby giving rise to a large change in stiffness or rigidity and to difficulties in feedback control, phase-locking or like follow-up operation.

At last there are already known in the field of sustaining or carrying loads and damping vibrations for some ten years and without their having ever been applied to torque transmission, cable or like wire-rope loops arranged in parallel relationship or helical winding turns or coils in which the damping or shock absorbing effect results from friction taking place between the strands of the loops.

The invention is directed to a device making use of similar loops or winding turns or coils for achieving torque transmission while bringing in particular about the following advantages:

a high damping or shock absorbing effect;

an outstanding filtering of vibrations and noises, the device exhibiting a high elasticity or resiliency according to six possible degrees of freedom;

a stiffness linearity and a damping effect of viscous character (proportional to speed);

a capability of admitting large misalignments or want of eccentricity;

a satisfactory operation irrespective of the environmental medium and thermal degree;

an electric continuity.

The invention aims in particular at a flexible coupling device comprising a flange or plate integral or fast with the driving member, a flange or plate integral or fast with the driven member and an elastic assembly consisting of wire-rope or cable loop elements arranged in such a manner between said flanges or plates that they become deformed under the action of a force or a torque so that the device will deform itself along a dimension or angularly without the other dimensions being varying, the assembly or unit recovering or being restored to, i.e. assuming again its initial shape when the forces or torques are no longer present, i.e. stop being applied.

The invention will be better understood and further characterizing features, objects, details and advantages thereof will appear more clearly as the following explanatory description proceeds with reference to the accompanying diagrammatic drawings given by way of non limiting example only illustrating a presently preferred specific form of embodiment of the invention and wherein:

FIG. 3 is a perspective view showing an element with wire-rope or cable loops;

Figure 1:
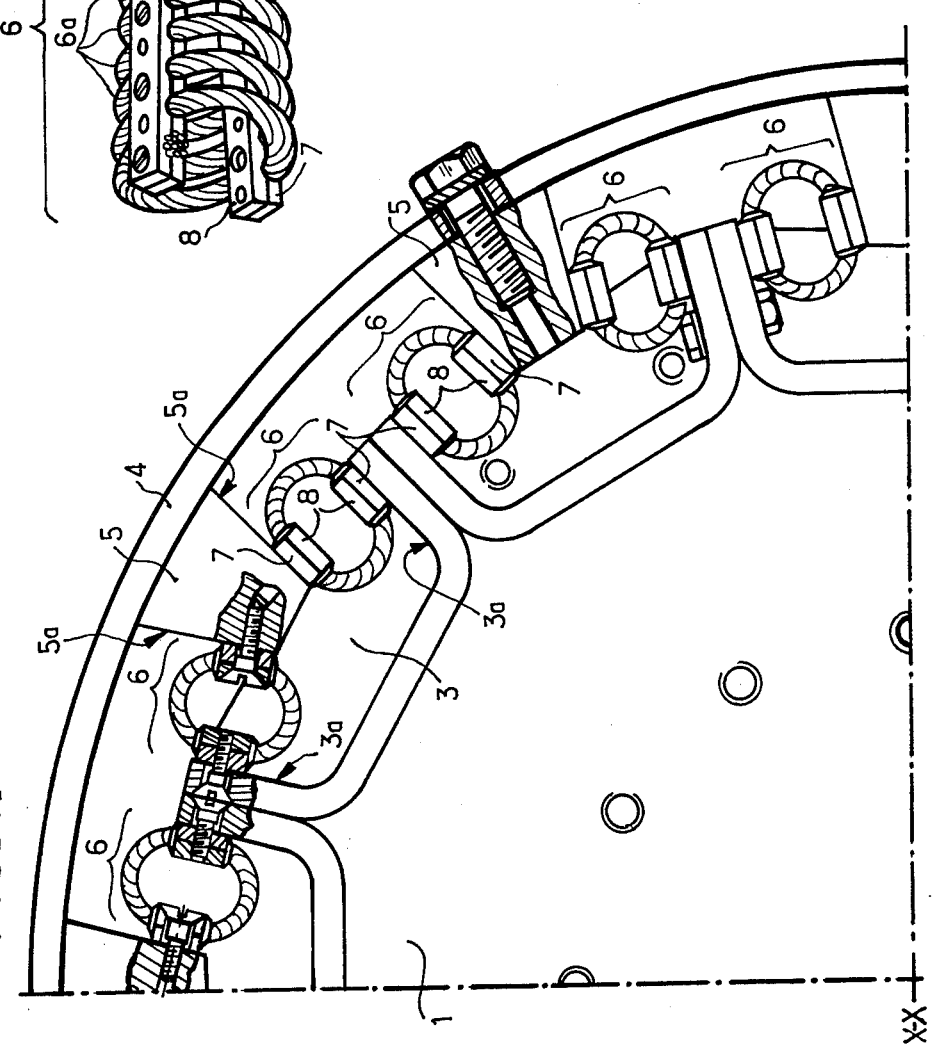
FIG. 1 is a partial front view of a flexible coupling device according to the invention.

According to the form of embodiment shown, a flexible device according to the invention comprises two plates 1 and 2 which may each one be indifferently integral with or rigidly connected to a driving part or member or a driven part or member.

The plate 1 carries trough-like elements 3 secured thereto and the plate 2 is formed at its periphery with an annular extension flange 4 supporting bar-shaped elements 5 secured thereto. There are as many trough elements as bar elements and every bar is arranged between the legs of a trough 3.

A helical winding or coil 6 of a stranded cable is provided between each one of the side faces 5a of each bar and the inner side face 3a, opposite thereto, of a corresponding leg of a trough.

The cable turns or coils 6a of a winding are entrapped or clamped between strip members 7 and 8. A pair of strip members are clamping therebetween a same portion of each turn or coil and are secured onto one side face 5a of a bar 5 and another pair of strip members are clamping therebetween an equivalent portion of each turn or coil in opposite relation thereto and are secured onto the opposite or confronting side face 3a of the leg involved of the corresponding trough 3.

Figure 2:
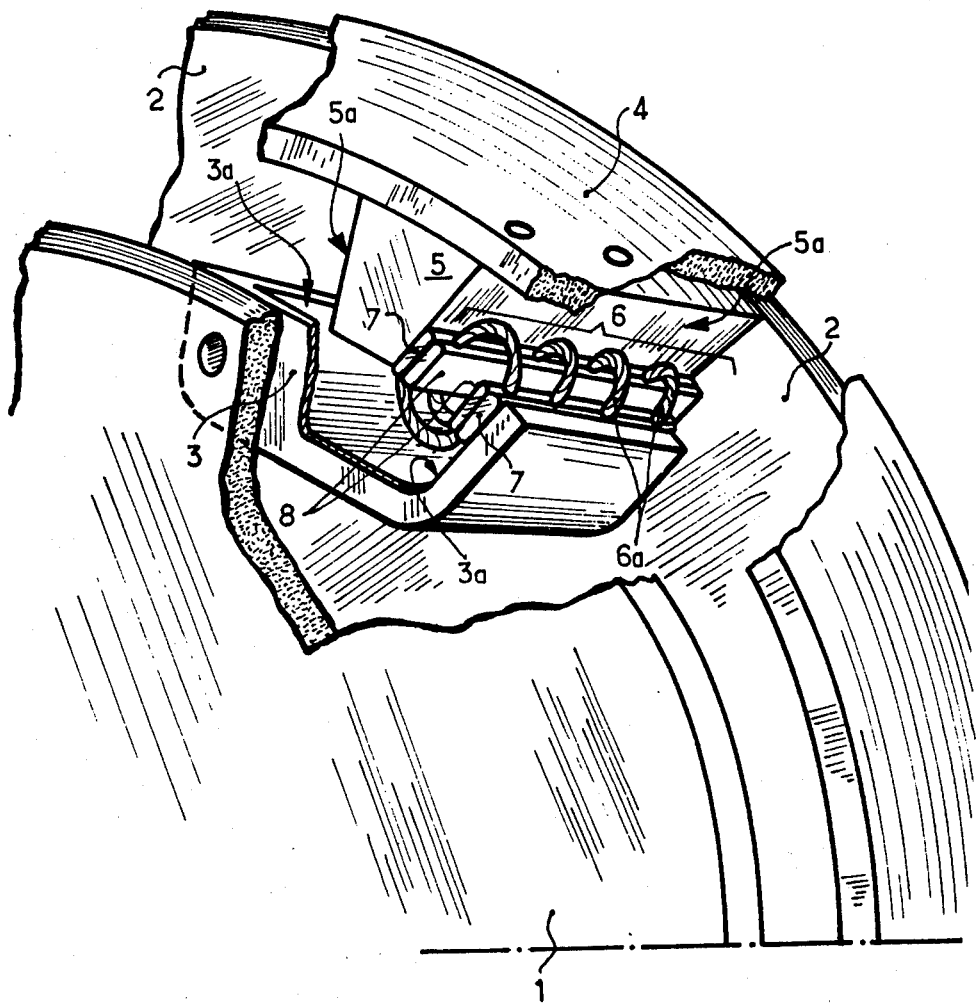
FIG. 2 is a fragmentary perspective view of such a device.
Figure 4:
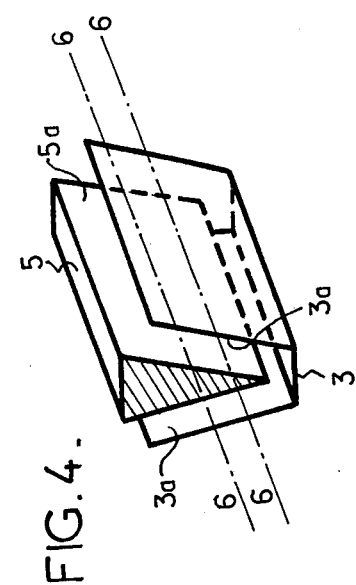

In FIGS. 1, 2 and 4 the helical windings are shown as being arranged in parallel relation to the geometrical axis x—x passing through the drive and driven shafts but their orientations may be different: for instance at right angles to that axis (as in FIG. 5), or skew with respect to the axis or there may be combinations of windings arranged according to differing orientations.

Figure 5:
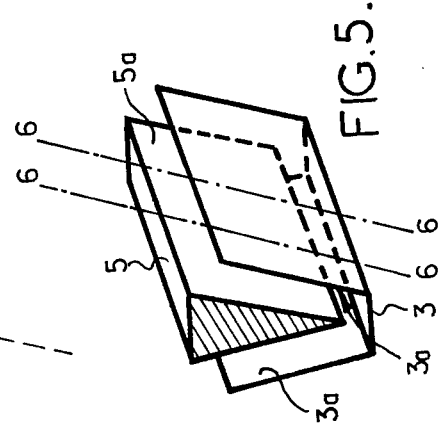
FIGS. 4 and 5 are perspective diagrammatic views illustrating two arrangements of loop elements, respectively.

In FIGS. 3 and 5 have been diagrammatically shown in chain-dotted lines 6—6 at least two parallel helical windings arranged in parallel relation to the axis x—x (FIG. 4) or at right angles to that axis (FIG. 5).

According to still another alternative embodiment (not shown) the helical windings are replaced by series of independent loops or rings.

Figure 7:
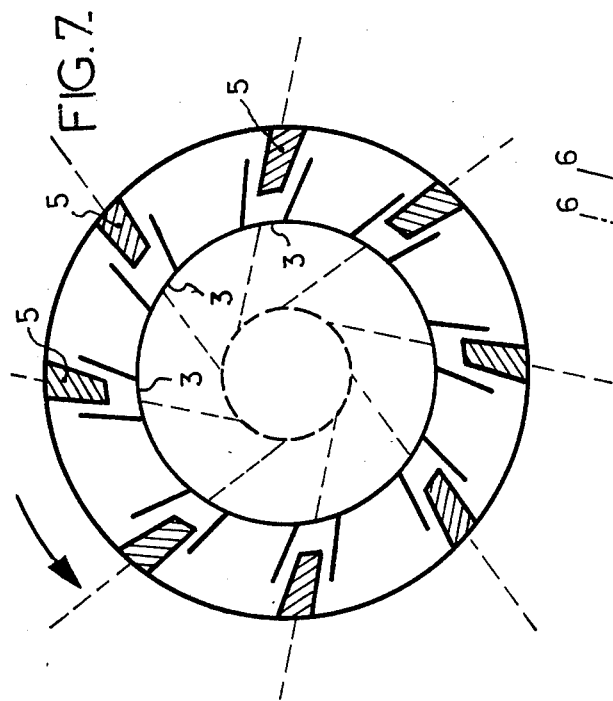
FIGS. 6 and 7 are diagrammatic views showing two general arrangements of the device.
Figure 6:
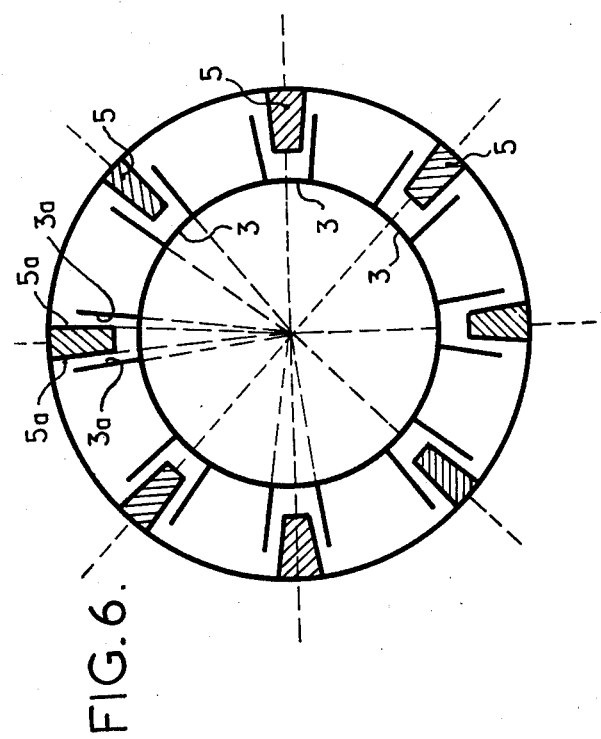

In FIGS. 1, 2 and 6 the side faces 5a of the bars 5 and the side faces 3a of the troughs 3 are shown as being arranged according to a star-like configuration (possibly with a pitch), but their orientations may be different: for instance tangential to an inner circle (as in FIG. 7) or in tangential relationship with a certain pitch.

Applying a torque to the device will result in the occurrence of a force lying within the planes of the loops and tending to move the strip members apart, i.e. away from or towards each other according to the direction of the torque, the axes or centre-lines of the strip members remaining parallel. In such a motion the cable loop will deform and act as a spring. The dry friction or rubbing effect between the deformed cable strands will provide a damping or a shock effect. Such a damping as considered for the whole bulk of the device appears to be of viscous character.

Removal of the torque will be attended by a return to the position of initial balance or equilibrium.

The invention may be applied as a flexible coupling between a driving appliance or apparatus and a driven appliance or apparatus whether they are aligned or not.

It should be understood that the present invention has been disclosed and shown by way of a preferred examplary embodiment only and that mechanically equivalent means may be substituted for its component elements without departing from the scope of the invention which is defined in the appended claims.

What is claimed is:

1. A flexible coupling and vibration damping device for a driving member and a driven member comprising a first cable loop element defined by a plurality of parallel loops of cable, said loops being substantially coaxial, first clamping means connected to a first peripheral portion of each of said loops, second clamping means connected to a second peripheral portion of each of said loops, first means for joining one of said members to one of said clamping means and second means for joining the other said member to the other said clamping means.

2. A device according to claim 1 wherein one of said joining means in a bar-like element affixed to said one member and having at least one sidewall and the other said joining means is a trough-shaped element affixed to said other member and formed with legs, said bar-like element being arranged between the legs of the trough-shaped element such that a portion of said one sidewall confronts a portion of one of said legs, one of said clamping means being joined to said sidewall and the other of said clamping means being joined to said leg.

3. A device according to claim 1 wherein the axis of said driving and driven members are common and substantially parallel to the common axis of said loops.

4. A device according to claim 1 wherein the axis of said driving and driven members are common and at substantially right angles to the common axis of said loops.

5. The device according to claim 1 wherein the axis of said driving and driven members are common and arranged at an angle with respect to the common axis of said loops.

6. A device according to claim 3 further including a second cable loop element oriented at a different angle with respect to the first cable loop element.

7. A device according to claim 4 further including a second cable loop element oriented at a different angle with respect to the first cable loop element.

8. A device according to claim 5 further including a second cable loop element oriented at a different angle with respect to the first cable loop element.

9. A device according to claim 1 wherein said first and second joining means are arranged in a substantially star-like pattern on the respective driving members.

10. A device according to claim 1 wherein said first and second joining means are oriented in tangential relation to a respective inner circumference of said first and second members.

11. A device according to claim 9 wherein said first and second joining means on said first and second members are arranged with a pitch.

12. A device according to claim 10 wherein said first and second joining means on said first and second members are arranged with a pitch.

13. A device according to claim 1 wherein said cable loop elements are helically wound coils.

14. A device according to claim 1 wherein said cable loop elements are independent loops.

* * * * *